Feb. 7, 1967 R. W. DE MONTE 3,303,437
BUILDING-OUT NETWORK FOR NON-LOADED TRANSMISSION LINES
Filed Nov. 16, 1964 2 Sheets-Sheet 1
FIG. 1
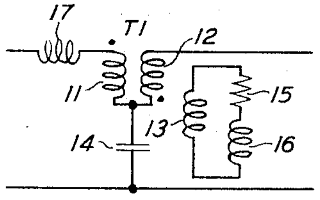
FIG. 2
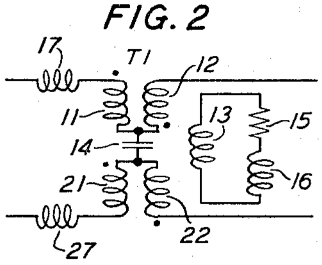
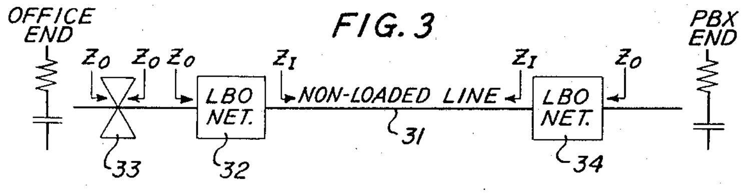
FIG. 4
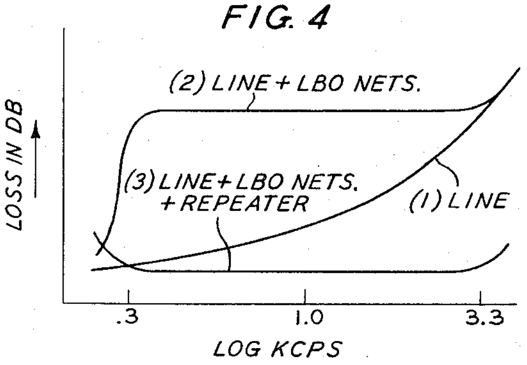
FIG. 5
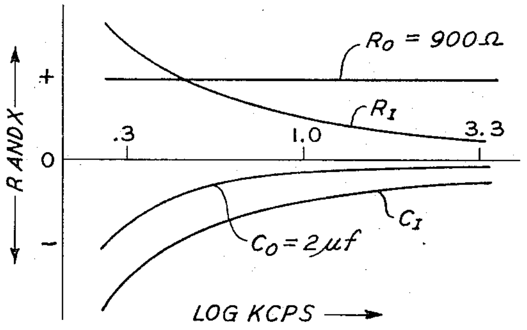
INVENTOR
R. W. DE MONTE
BY R. B. Anlis
ATTORNEY

BUILDING-OUT NETWORK FOR NON-LOADED TRANSMISSION LINES

Filed Nov. 16, 1964

2 Sheets-Sheet 2

United States Patent Office 3,303,437
Patented Feb. 7, 1967

3,303,437
BUILDING-OUT NETWORK FOR NON-LOADED TRANSMISSION LINES

Robert W. De Monte, Berkeley Heights, N.J., assignor to Bell Telephone Laboratories, Incorporated, New York, N.Y., a corporation of New York Filed Nov. 16, 1964, Ser. No. 411,509
6 Claims. (Cl. 333—28)

This invention relates generally to voice-frequency transmission systems and more particularly to voice-frequency transmission systems which employ non-loaded transmission lines and negative impedance repeaters.

In the voice-frequency telephone plant, it is occasionally desirable to avoid the use of coil-loaded transmission lines and employ non-loaded lines instead. In areas where line density is low, the cost per line of installing regularly spaced loading coils is quite high and it is more economical to use non-loaded lines. In other areas, where lines which are used to transmit voice-frequency telephone messages may also be called upon to transmit high-speed pulse-type data signals, the upper cut-off frequencies of coil-loaded lines are too low to transmit the data signals without serious distortion and non-loaded lines need to be used instead.

To date, the most satisfactory device which has been devised for inserting bilateral gain in a voice-frequency transmission line is the negative impedance repeater. One type, which has been used in conjunction with both coil-loaded and non-loaded lines, is disclosed in United States Patent 2,742,616, which issued April 17, 1956, to J. L. Merrill, Jr. This repeater employs a complex terminating network which is designed to simulate the impedance characteristic of the line with which it is used. As a result, every time the resistance of a terminating network is changed to shift the repeater gain, an accompanying change must be made in the reactive elements in the terminating network in order to maintain the desired impedance characteristic.

More recently, a negative impedance repeater has been developed which is terminated in a resistance rather than in a complex impedance. Such a repeater is disclosed, for example, in United States Patent 3,042,759, which issued July 3, 1962, to A. L. Bonner, and is advantageous in that only a simple resistance change is needed for each gain adjustment. Since few transmission lines have image impedances which even approximate pure resistances, however, it is necessary to use an auxiliary network between the line and the repeater to build out the line impedance to something approximating a pure resistance. Building out to a pure resistance has not proved feasible in practice for a number of reasons, so a compromise impedance of approximately 900 ohms and 2 microfarads is used instead. Line building-out networks which meet this requirement for coil-loaded lines are disclosed in United States Patent 2,957,944, which issued October 25, 1960, to the present inventor. Until now, however, the problem of providing a suitable line building-out network for non-loaded lines has defied solution.

The problem of providing a suitable line building-out network for non-loaded lines is made more difficult by the loss versus frequency characteristic of such lines. A negative impedance repeater of the type shown in the Bonner patent is essentially a flat-gain repeater in that its gain is substantially constant over the voice-frequency band. Such a gain characteristic is quite well suited for repeaters used with coil-loaded lines, since coil-loaded lines have loss characteristics which are flat all the way up to their cut-off frequencies. Non-loaded transmission lines, however, have loss characteristics which exhibit a steady rise with increasing frequency and equalization is necessary if a flat-gain repeater is to be employed.

One object of the present invention is, therefore, to build out the impedance of a non-loaded transmission line to the standard compromise impedance of 900 ohms and 2 microfarads.

Another object is to accomplish, in addition, equalization of the loss versus frequency characteristic of a non-loaded transmission line.

Still another object of the invention is to accomplish both of the above objects in as simple a manner as possible while still permitting transmission without impairment of D.-C. telephone signaling impulses.

In accordance with a principal feature of the invention, a non-loaded voice frequency transmission line is provided with a combined building-out network and equalizer which takes the form of a transformer having at least three inductively coupled windings, a pair of which are connected in series aiding relation with each other in series with one side of the line, a capacitor connected from the junction between the two line windings and the other side of the line, and a passive terminating impedance including at least a resistance and an inductance connected across the remaining transformer winding. The transformer turns ratio and the magnitudes of the resistance and inductance of the terminating network are proportioned not only to build the line impedance out to the desired 900 ohms and 2 microfarads but also to equalize the line versus frequency characteristic of the line in the voice-frequency range. The type of easily adjusted negative impedance repeater disclosed in the Bonner patent can thus be used in conjunction with a non-loaded line. The line building-out network requires a minimum number of circuit elements and conductive continuity is preserved on both sides of the line to permit transmission of D.-C. telephone signaling impulses without impairment.

In accordance with another feature of the invention, a line building-out network of this type is used at both ends of a section of non-loaded telephone transmission line in order to avoid echo and prevent self-oscillation. The terminating impedances of such a line are changed as the line becomes idle or busy and as the line is switched from one connecting circuit to another. The compromise impedance of 900 ohms and 2 microfarads is a sufficiently close approximation of the normal central office and subscriber telephone set impedance that unavoidable impedance mismatches are minimized at both ends of the line. A negative impedance repeater of the type disclosed in the Bonner patent may be used at one end of the line to provide any necessary gain.

An important advantage of the invention is that it permits individual sections of transmission line in the voice-frequency telephone plant to be used as standard links, either with or without negative impedance repeaters of the type shown in the Bonner patent at junction points. A non-loaded line equipped with line building-out networks featuring the present invention may readily be connected in tandem with other non-loaded lines similarly equipped or with coil-loaded lines equipped with line building-out networks of the type shown in the present inventor's above-identified prior patent. Impedance mismatches are minimized and problems of echo and self-oscillation are avoided. Since gain may be provided at each junction point by negative impedance repeaters, it may be effectively distributed along the length of a built-up connection rather than concentrated at one end where it might have to be of such a large magnitude as to cause a troublesome amount of cross-talk into adjacent lines.

A more complete understanding of the invention may be obtained from a study of the following detailed description of several specific embodiments. In the drawings:

FIG. 1 illustrates a line building-out network embodying the invention in one of its simplest forms;

FIG. 2 illustrates a modification of the embodiment of the invention illustrated in FIG. 1 for use with balanced lines;

FIG. 3 is a block diagram of a voice-frequency transmission link employing the invention in conjunction with a negative impedance repeater;

FIG. 4 illustrates the loss versus frequency characteristics of a non-loaded transmission line by itself, with line building-out networks, and with both line building-out networks and a negative impedance repeater;

FIG. 5 shows the impedance correcting function performed by embodiments of the present invention;

Figure 6:
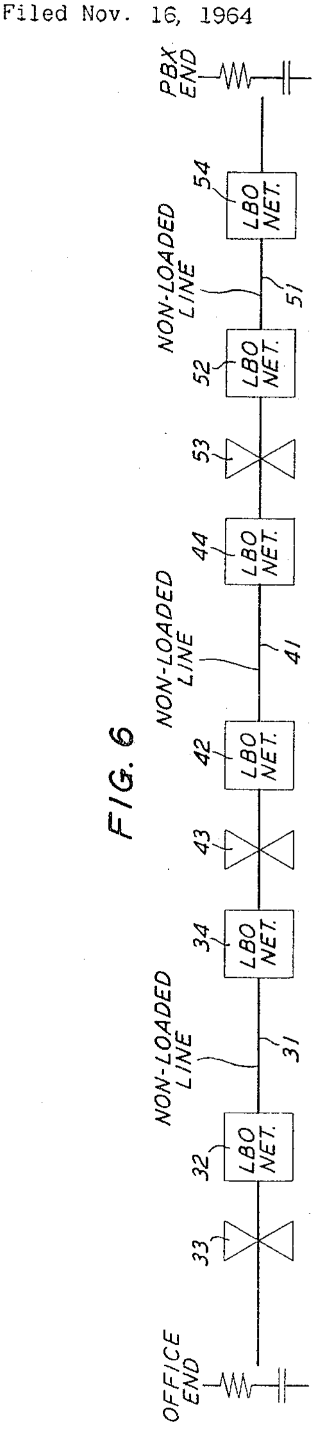
FIG. 6 shows the manner in which several transmission links of the type illustrated in FIG. 3 can be connected in tandem to form a single built-up connection.

The embodiment of the invention illustrated in FIG. 1 is a four terminal line building-out network for use with unbalanced non-loaded lines. As illustrated, it is made up of a transformer T1 having three inductively coupled windings 11, 12, and 13, a capacitor 14, and a passive terminating network consisting of a resistor 15 and an inductor 16. Windings 11 and 12 are connected in series aiding relating with each other between one of each set of terminals for connection in series with one side of the line. A capacitor 14 is connected from the junction between windings 11 and 12 to a conductive connection between the remaining two terminals for connection to the other side of the line. The terminating network made up of resistor 15 and inductor 16 is connected directly across winding 13. Finally, an inductor 17, which may be either a separate inductor or merely the leakage inductance of transformer T1, is connected in series with winding 11.

A balanced version of the embodiment of the invention shown in FIG. 1 is illustrated in FIG. 2. As shown, transformer T1 has two additional windings 21 and 22 which are inductively coupled to the others and an additional inductor 27 which, like inductor 17, may be either a separate inductor or part of the leakage inductance of transformer T1. Windings 21 and 22 are connected in series aiding relation with each other between the lower two terminals for connection in series with that side of the line. The through connection is still conductive, permitting free passage of D.-C. impulses, and capacitor 14 is connected from the junction between windings 11 and 12 to the junction between windings 21 and 22.

A complete voice-frequency link using a line building-out network in accordance with the invention is illustrated in FIG. 3. The link may be used, by way of example, to provide two-way transmission between a telephone central office and a telephone subscribed facility such as a private branch exchange (frequently referred to simply as a PBX). The link is made up, as shown, by a non-loaded voice-frequency transmission line 31, a line building-out (LBO) network 32 at the office end of line 31, a negative impedance repeater 33 of the type shown in the Bonner patent between line building-out network 32 and the office equipment, and a line building-out network 34 at the PBX end of line 31. As shown, the impedance $Z_O$ presented at both ends of the link is transformed from $Z_I$, the image impedance of line 31, and has a resistive component of preferably 900 ohms and a capacitive component of preferably 2 microfarads. Line building-out networks 32 and 34 are of the general type shown in FIG. 1 when non-loaded line 31 is unbalanced with respect to ground. When, as is far more likely in the telephone plant, line 31 is balanced with respect to ground, line building-out networks 32 and 34 are of the general type shown in FIG. 2.

The manner in which line building-out networks embodying the invention equalize the loss and correct the impedance of a non-loaded transmission line is illustrated in FIGS. 4 and 5. FIG. 4 illustrates the loss versus frequency curve over the voice-frequency range (1) of a non-loaded transmission line alone, (2) of a non-loaded transmission line with line building-out networks embodying the invention, and (3) of a non-loaded transmission line with both line building-out networks and a negative impedance repeater. The loss characteristic of the line alone exhibits a steady rise with frequency and the line building-out networks insert a loss which occurs predominantly in the lower portion of the voice-frequency range. The resultant loss characteristic of the line plus the line building-out networks is substantially flat with frequency up to the upper end of the band. When negative impedance repeater 33 is added, the loss characteristic remains flat over the voice-frequency range, but the level of the loss is reduced to the desired low value.

In FIG. 5, the curves marked $R_I$ and $C_I$ represent the respective resistive and reactive components of $Z_I$, the image impedance of non-loaded line 31 itself. The curves marked $R_O$ and $C_O$ represent the respective resistive and reactive components of $Z_O$, the impedance presented to negative impedance repeater 33 by line building-out network 32, to the PBX by line building-out network 34, and to both line building-out network 32 and the office by negative impedance repeater 33. As indicated, over the voice-frequency range $Z_O$ is substantially 900 ohms and 2 microfrads.

A simple explanation of the operation of the line building-out networks embodying the invention is that, over the voice-frequency band, resistor 15 and inductor 16 act as a shunt across the line, inserting a bell-shaped loss which equalizes the loss of the line. At the same time, this shunt modifies the shape of the line impedance and, with the aid of the turns ratio of the transformer, a broadband impedance match is made to 900 ohms plus 2 microfarads. Capacitor 14 acts as an open circuit at very low frequencies and is a short circuit at the upper end of the voice band. The fact that capacitor 14 appears as an open circuit at very low frequencies and that D.-C. continuity is preserved on both sides of the line in the line building-out network permit D.-C. telephone signaling impulses to be transmitted readily without impairment.

An example of the manner in which the number of voice-frequency links of the type shown in FIG. 3 may be placed in tandem to form a single connection from the central office to some such subscriber facility as a PBX is shown in FIG. 6. There, three separate links are employed, each containing a section of non-loaded voice-frequency transmission line, a separate line building-out network at each end, and a separate negative impedance repeater. As shown in FIG. 6, there are three sections of non-loaded line 31, 41, and 51, three line building-out networks 32, 42, and 52 at the office or repeater ends of their respective sections, three negative impedance repeaters 33, 43, and 53, and three line building-out networks 34, 44, and 54 at the PBX or remote ends of their respective sections. Since several negative impedance repeaters are used, the gain of each need be only a fraction of the gain which would be required if only one were used for a line of similar total length. Signal levels at all points along the connection are, for this reason, not excessive and the problems of cross talk into adjacent lines which would arise if gain were concentrated at one end are minimized.

Since line building-out networks embodying the invention build the impedance of a non-loaded line out to a standard impedance of 900 ohms and 2 microfarads, individual links of the kind shown in FIGS. 3 and 6 may also be connected in tandem with sections of coil-loaded line equipped at both ends with line building-out networks of the type shown in the Huxtable patent and in the present inventor's above-identified prior patent. These line building-out networks transform the impedance of a coil-loaded line to the same standard impedance of 900 ohms and 2 microfarads. The present invention thus makes possible the utmost flexibility in connecting a number of voice-frequency transmission links in tandem. No longer must such a connection be restricted to coil-loaded lines. Instead, sections of coil-loaded and non-loaded line may be intermixed at will with no significant performance penalty.

Figure 8:
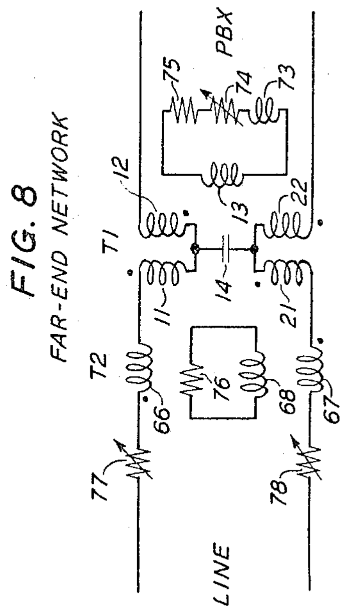
FIGS. 7 and 8 are schematic diagrams of specific line building-out networks embodying the invention for connection to the central office and private branch exchange ends, respectively, of a non-loaded voice frequency telephone line.
Figure 7:
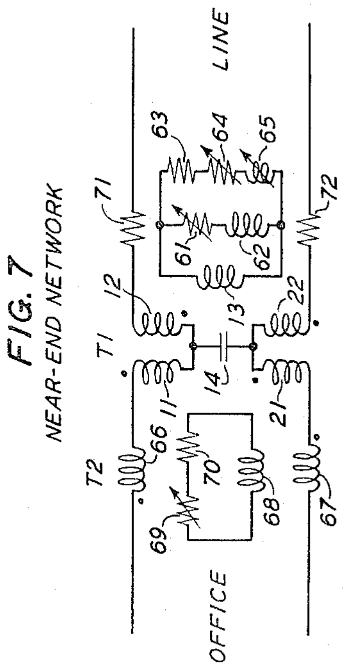

FIGS. 7 and 8 are detailed schematics of specific networks embodying the invention which have been developed for non-loaded transmission lines in the voice-frequency telephone plant. The network shown in FIG. 7 is a modification of the more general network shown in FIG. 2 for use as a near-end network, i.e., for use at the end of its line section which is nearest the central office. The network shown in FIG. 8 is a modification for use as a far-end network, i.e., for use at the end of its line section which is farthest from the central office. Network 32 in FIG. 3 and networks 32, 42, and 52 in FIG. 6 are examples of the former, while network 34 in FIG. 3 and networks 34, 44, and 54 in FIG. 6 are examples of the latter.

In the near-end line building-out network shown in FIG. 7, the simple fixed resistance-inductance terminating network for winding 13 is replaced by a more complex variable resistance-inductance network for added flexibility. As shown in FIG. 7, a first arm made up of a variable resistor 61 and a fixed inductor 62 in series and a second arm made up of a fixed resistor 63, a variable resistor 64, and a variable inductor 65 in series are connected in parallel across winding 13 of transformer T1. Resistor 61 adjusts the return loss of the line with which the line building-out network is used at frequencies below 1000 cycles, while inductor 62 prevents resistor 61 from affecting the operation at higher frequencies. Resistors 63 and 64 are used with inductor 65 to fix the effective impedance presented by the line building-out network within the voice-frequency band of from approximately 300 cycles to approximately 3300 cycles.

The effect of inductors 17 and 27 in FIG. 2 is achieved in the near-end line building-out network in FIG. 7 by a transformer T2 which has three inductively coupled windings 66, 67, and 68. Windings 66 and 67 are oppositely poled, as illustrated, with one connected in series with winding 11 and the other connected in series with winding 21 of transformer T1. A passive series terminating network consisting of a variable resistor 69 and a fixed resistor 70 is connected across winding 68. Transformer T2 provides additional impedance control at frequencies above the voice-frequency band and improves the margin against singing. Fixed resistor 70 prevents winding 68 from becoming short circuited when variable resistor 69 is at the lower end of its range.

Finally, a pair of resistors 71 and 72 are connected in series with windings 12 and 22, respectively, on the line end of the near-end line building-out network in FIG. 7 to improve the margin against singing over broad temperature ranges.

The following component values for the near-end building-out network illustrated in FIG. 7 for use with 22, 24, or 26 gauge cable are given by way of example:

| Element: | Value |
|---|---|
| Transformer T1 | Turns ratio 1:4:1 (windings **11** and **21**: windings **12** and **22**: winding **13**). |
| Transformer T2 | 15 millihenries (windings **66** and **67**). |
| Capacitor **14** | .706 microfarad. |
| Resistor **61** | 0 to 75 ohms. |
| Inductor **62** | 19 millihenries. |
| Resistor **63** | 20 ohms. |
| Resistor **64** | 0 to 30 ohms. |
| Inductor **65** | .05 to .8 millihenry. |
| Resistor **69** | 0 to 400 ohms. |
| Resistor **70** | 249 ohms. |
| Resistor **71** | 56.9 ohms. |
| Resistor **72** | 56.9 ohms. |

In the far-end line building-out network shown in FIG. 8, the terminating network for winding 13 is made up of the series combination of an inductor 73, a variable resistor 74, and a fixed resistor 75. This is substantially identical to the fixed network illustrated in FIG. 2, but the resistance component is made variable to accommodate different lengths and guages of line. Instead of being terminated in a variable resistor as in FIG. 7, winding 68 of transformer T2 in FIG. 8 is terminated by a fixed resistor 76. The function of transformer T2 is to reduce the insertion loss of the line building-out network at frequencies above 1000 cycles. Finally, a pair of variable resistors 77 and 78 are connected in series with windings 66 and 67, respectively, to provide at least a minimum of 600 ohms loop resistance for D.-C. signaling purposes on short lengths of line.

The following component values for the far-end line building-out network illustrated in FIG. 8 for use with 22, 24, or 26 gauge cable are given by way of example:

| Element: | Value |
|---|---|
| Transformer T1 | Turns ratio 1:4:1 (windings **11** and **21**: windings **12** and **22**: winding **13**). |
| Transformer T2 | 15 millihenries (windings **66** and **67**). |
| Capacitor **14** | 1 microfarad. |
| Inductor **73** | 3.8 millihenries. |
| Resistor **74** | 0 to 55 ohms. |
| Resistor **75** | 20 ohms. |
| Resistor **76** | 402 ohms. |
| Resistor **77** | 56.9 to 170.9 ohms. |
| Resistor **78** | 56.9 to 170.9 ohms. |

It is to be understood that the above described arrangements are illustrative of the application of the principles of the invention. Numerous other arrangements may be devised by those skilled in the art without departing from the spirit and scope of the invention.

What is claimed is:

1. A combined building-out network and equalizer for a non-loaded conductive transmission line which comprises a pair of input terminals and a pair of output terminals, a transformer having at least three inductively coupled windings, a pair of said windings being connected in series aiding relation with each other and forming a first conductive connection between one of said input terminals and one of said output termials, a second conductive connection between the other of said input temrinals and the other of said output terminals, a capacitor connected directly from the junction between said pair of windings and said second conductive connection, and a passive impedance comprising a resistance and an inductance connected across the third of said windings.

2. In combination, a non-loaded conductive transmission line and a combined building-out network and equalizer which comprises a transformer having at least three inductively coupled windings, a pair of said windings being connected in series aiding relation with each other in series with one side of said line and forming a conductive continuation thereof, a capacitor connected directly from the junction between said pair of windings to the other side of said line, and a passive impedance comprising a resistance and an inductance connected across the third of said windings.

3. In combination, a non-loaded conductive voice-frequency transmission line and a combined building-out network and equalizer at at least one end of said line which comprises a transformer having at least three inductively coupled windings, a pair of said windings being connected in series aiding relation with each other in series with one side of said line and forming a conductive continuation thereof, a capacitor connected directly from the junction between said pair of windings to the other side of said line, and a passive impedance comprising a resistance and an inductance connected across the third of said windings, the turns ratio of said transformer and the magnitude of said resistance and said inductance being proportioned not only to build the impedance of said line out to an impedance having a resistance component and a capacitive reactance component at least several times smaller than said resistance component in the voice-frequency band but also to make the loss of said line and said network together substantially constant with frequency over at least a major portion of the voice-frequency band.

4. A combined building-out network and equalizer for a non-loaded balanced two-wire conductive transmission line which comprises a pair of input terminals and a pair of output terminals, a transformer having at least five inductively coupled windings, a first pair of said windings being connected in series aiding relation with each other and forming a conductive connection between one of said input terminals and one of said output terminals and a second pair of said windings being connected in series aiding relation with each other and forming a conductive connection between the other of said input terminals and the other of said output terminals, a direct connection from the junction between said first pair of windings to the junction between said second pair of windings consisting only of a capacitor, and a passive impedance comprising a resistance and an inductance connected across the remaining one of said windings.

5. In combination, a non-loaded balanced two-wire conductive transmission line and a combined building-out network and equalizer which comprises a transformer having at least five inductively coupled windings, a first pair of said windings being connected in series aiding relation with each other in series with one side of said line and forming a conductive continuation thereof and a second pair of said windings being connected in series aiding relation with each other in series with the other side of said line and forming a conductive continuation thereof, a direct connection from the junction between said first pair of windings to the junction between said second pair of windings consisting only of a capacitor, and a passive impedance comprising a resistance and an inductance connected across the remaining one of said windings.

6. In combination, a non-loaded balanced two-wire voice-frequency conductive transmission line and a combined building-out network and equalizer at at least one end of said line which comprises a transformer having at least five inductively coupled windings, a first pair of said windings being connected in series aiding relation with each other in series with one side of said line and forming a conductive continuation thereof and a second pair of said windings being connected in series aiding relation with each other in series with the other side of said line and forming a conductive continuation thereof, a direct connection from the junction between said first pair of windings to the junction between said second pair of windings consisting only of a capacitor, and a passive impedance comprising a resistance and an inductance connected across the remaining one of said windings, the turns ratio of said transformer and the magnitude of said resistance and said inductance being proportioned not only to build the impedance of said line out to an impedance having a resistance component and a capacitive reactance component at least several times smaller than said resistance component in the voice-frequency band but also to make the loss of said line and said network together substantially constant with frequency over at least a major portion of the voice-frequency band.

References Cited by the Examiner

UNITED STATES PATENTS

| | | | |
|---|---|---|---|
| 1,951,883 | 3/1934 | Roseway | 179—170 X |
| 2,085,952 | 7/1937 | Cauer et al. | 333—77 X |
| 3,204,048 | 8/1965 | De Monte | 179—170 |

References Cited by the Applicant

UNITED STATES PATENTS

| | | |
|---|---|---|
| 2,742,616 | 4/1956 | Merrill. |
| 2,957,944 | 10/1960 | De Monte. |
| 2,978,542 | 4/1961 | Huxtable. |
| 3,042,759 | 7/1962 | Bonner. |

HERMAN K. SAALBACH, *Primary Examiner.*

P. L. GENSLER, E. LIEBERMAN, *Assistant Examiners.*